No. 611,137. Patented Sept. 20, 1898.
J. MORRISON.
BICYCLE CRANK SHAFT BEARING.
(Application filed Sept. 22, 1897.)
(No Model.)
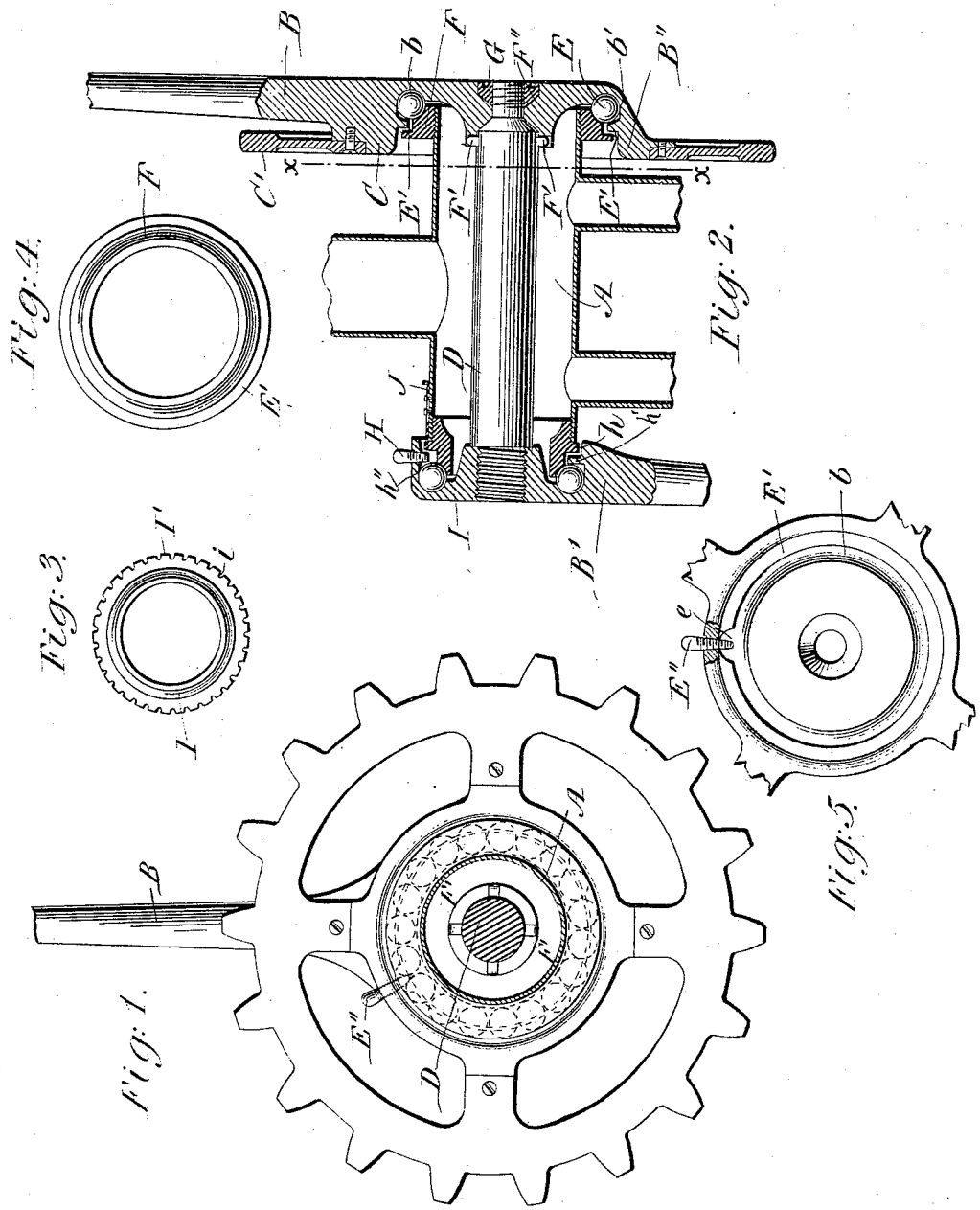
Witnesses.
John Rennie
Philip C. Masi.
Inventor.
Josiah Morrison
by E. W. Anderson
his Attorney.

UNITED STATES PATENT OFFICE.

JOSIAH MORRISON, OF ANDERSON, INDIANA.

BICYCLE CRANK-SHAFT BEARING.

SPECIFICATION forming part of Letters Patent No. 611,137, dated September 20, 1898.

Application filed September 22, 1897. Serial No. 652,622. (No model.)

*To all whom it may concern:*

Be it known that I, JOSIAH MORRISON, a citizen of the United States, and a resident of Anderson, in the county of Madison and State of Indiana, have invented certain new and useful Improvements in Bicycle Crank-Shaft Bearings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a section on the line $x\ x$, Fig. 2. Fig. 2 is a central longitudinal section of the same. Figs. 3 and 4 are detail views, respectively, of the two cones; and Fig. 5 is a view showing the inner face of the sprocket-carrying crank-hub.

This invention is designed to provide an improved crank-shaft bearing for bicycles and like vehicles, and more especially to provide a bearing of this character wherein the balls are brought into the planes of the cranks and at a greater radial distance from the crank-shaft center, thereby reducing the friction and strain upon the parts and providing a bearing which is stronger and more efficient in many respects than are those wherein the balls are located within the crank-shaft hanger and between the cranks.

Other objects and advantages of the invention will hereinafter appear.

With these objects in view the invention consists in the novel construction and combination of parts, all as hereinafter described, and pointed out in the appended claims.

Referring to the accompanying drawings, the letter A designates the crank-shaft hanger, B B' the two cranks, and C C' the sprocket-wheel, the inner portion C of which is rigidly secured to or integral with the hub portion B'' of the crank B, while the outer portion C' is a detachable rim of the usual character. D is the crank-shaft. The said hub or inner end portion B'' of the crank is annularly recessed or chambered upon its inner side, as shown at $b$, and the bottom of this chamber is annularly grooved or channeled to form a ball-race $b'$, in which are the series of balls E. The chamber $b$ and ball-race $b'$ are of such a depth that the centers of the balls E are brought to coincide or substantially coincide with the center line of the crank. Projecting into the chamber $b$ is an annular ball-retaining flange E', which is integral with the said hub portion. The balls E are inserted into the ball-race through an opening or gate $e$ in said flange, which is normally closed by means of a removable oil-cup or plug E''. F is a cone which is screwed upon the end portion of the crank-shaft hanger within the inner portion C of the sprocket-wheel and extending within the retaining-flange E'. The crank B is removably secured to the shaft D by means of a series of lugs F' on the shaft, which engage corresponding recesses of the hub of the crank. G is a cone-nut which is screwed up against the said hub within a depression F''' thereof. The crank B' is rigidly secured to the crank-shaft in the usual manner, and its inner end or hub portion is provided with a recess or chamber $h$, a ball-retaining flange $h'$, and a ball-race $h''$ of the same character as the corresponding parts $b\ b'$ and E' of the crank B. H is a removable oil-cup or plug which closes the ball opening or gate in said flange $h'$. I is the cone at this end of the bearing. This cone is threaded within the end portion of the hanger A and is designed to be adjusted, being formed with a circumferential flange I', in which are a series of notches $i$ or, it may be, perforations. J is a sliding catch or lock device, the end portion of which is designed to engage any one of the holes $i$, and thereby lock said cone in the desired adjustment.

The bearing above described, it will be readily seen, reduces considerably the number of separate parts usually employed in devices of this kind, is strong and durable, its parts can be readily taken apart, cleaned, and replaced without loss or misplacement of the balls, while at the same time the arrangement of the balls upon cones of enlarged diameters and in the planes of the cranks, whereby the friction is brought directly under the foot, largely reduces the strain upon the parts.

I am aware of the patent to Burnham and Alsup, No. 550,587, dated December 3, 1895, and hence do not attempt to claim, broadly, a bearing wherein the balls are located within the chambered hubs of the cranks. In so far as I am aware, however, my construction and arrangement of the parts as described and as pointed out in the appended claims are novel and are possessed of advantages not to my knowledge found to the same extent in other bearings.

Having thus described my invention, what I claim as new, and desire to secure by Letters Patent, is—

1. In a crank-shaft bearing for bicycles and the like, the combination with a crank-shaft and its hanger having the large cones at its end portions, of the cranks having their inner end or hub portions annularly recessed or chambered and having the bottom walls of such chambers grooved or channeled to form ball-races, said hub portions also having integral ball-retaining flanges extending into the said chambers and provided each with a gate or opening, means for closing the said gates or openings, and the balls in said races and bearing upon the said cones, substantially as specified.

2. A crank for bicycles and the like, having its inner end portion or hub formed with an annular chamber therein and with an integral annular ball-retaining flange projecting into the said chamber and provided with a ball gate or opening therein, with means for closing said opening, substantially as specified.

3. In a crank-shaft bearing for bicycles and the like, the combination of the hanger, the crank-shaft, the adjustable cone I screwed into one end portion of said hanger and having a circumferential flange provided with a series of perforations or notches, a locking device adapted to engage any one of said notches, the crank $B'$ having the annular chamber $h$ in its hub portion, the ball-race $h''$ in the bottom of said chamber, and the integral retaining-flange $h'$ projecting into the said chamber and having a ball gate or opening therein, an oil plug or cup for closing the said opening, substantially as specified.

In testimony whereof I affix my signature in presence of two witnesses.

JOSIAH MORRISON.

Witnesses:
SAMUEL P. MOORE,
D. C. CHIPMAN.